United States Patent [19]
McNeil

[11] 3,788,044
[45] Jan. 29, 1974

[54] VORTEX FLASH SEPARATOR

[76] Inventor: John A. McNeil, 161 Franklin Ave., Brookville, Pa. 15825

[22] Filed: Feb. 23, 1972

[21] Appl. No.: 228,502

[52] U.S. Cl.................. 55/204, 55/218, 55/DIG. 22
[51] Int. Cl............................................ B01d 53/24
[58] Field of Search ....... 55/204, 218, 435, DIG. 22

[56] References Cited
UNITED STATES PATENTS

| | | | |
|---|---|---|---|
| 1,766,666 | 6/1930 | Meyer | 55/218 |
| 2,739,668 | 3/1956 | Huge | 55/204 X |
| 1,897,332 | 2/1933 | Raymond | 55/204 |
| 3,008,538 | 11/1961 | Glasgow | 55/204 X |
| 2,762,451 | 9/1956 | McNeil | 55/204 |

*Primary Examiner*—Samih N. Zaharna
*Assistant Examiner*—R. W. Burks
*Attorney, Agent, or Firm*—Parmelee, Miller, Welsh & Kratz

[57] ABSTRACT

An improved apparatus has been devised for separating pure steam or dry vapor from a hot effluent being introduced under positive pressure and for enabling utilization of B.T.U.'s in an effluent fluid such as being supplied by a boiler or pressure vessel or a blow-down discharge. The flash or steam is removed by employing a centrally disposed vortex separating action in an upper sector or portion of and by moving the effluent in a cyclonic path through an intermediate sector of a chambered apparatus, with condensate and liquid as well as sludge being separated therefrom and collected in a lower sector thereof. A liquid level is maintained in the lower section and liquid being removed is cooled without adversely affecting the separating action, before its discharge from the apparatus.

10 Claims, 4 Drawing Figures

PATENTED JAN 29 1974  3,788,044

VORTEX FLASH SEPARATOR

BACKGROUND OF THE INVENTION

1. Field of the Invention

This invention relates to an improved flash separator for removing steam from hot water and other liquids that exist above their flash points, and to an improved vortex separating apparatus which utilizes a liquid level in its lower chamber and vents high temperature steam through a centrally disposed upper discharge pipe.

2. Description of the Prior Art

There have been many forms of apparatus for recovering pure steam or flash from boiler pressure vessels, etc., while at the same time collecting the water or liquid. Heretofore, devices of this type have been rather complex and many have produced eerie sound effects during their operation. Difficulty has also been encountered in connection with the use of the apparatus where pressures vary and from the standpoint of blow-through of steam under a greater or a change of load or pressure application.

SUMMARY OF THE INVENTION

It has thus been an object of the present invention to provide a relatively simple but highly efficient, effective and inexpensive flash separating apparatus that will meet the need particularly for a separator that can be used for effluent as supplied under varied pressure, quantity and velocity conditions.

Another object of the invention has been to provide a separator device that will be particularly effective from the standpoint of providing liquid in a cooled condition such that, if in the nature of water, it may be discharged directly into a stream or other body of water.

A further object has been to devise an improved flash separator that may be employed for effectively cooling liquid before it is discharged and that is quiet in its operation.

A still further object of the invention has been to provide a flash separator whose parts are proportioned to provide a maximum efficiency of operation and particularly, from the standpoint of avoiding through steam flow or liquid pick-up by the steam.

These and other objects of the invention will appear to those skilled in the art from the illustrated embodiment.

DESCRIPTION OF THE PREFERRED EMBODIMENT

Figure 1:
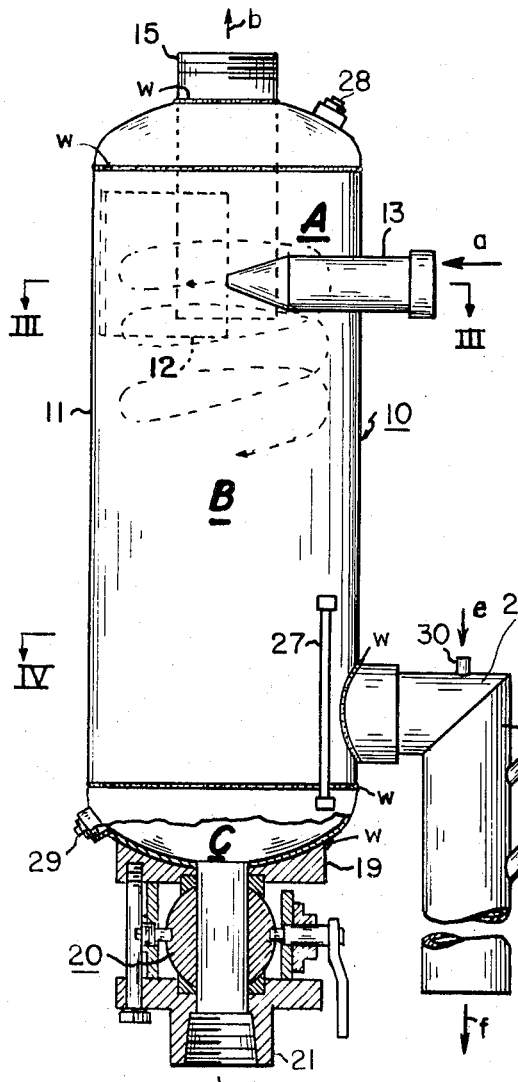
FIG. 1 is a side view in elevation of a flash separator unit constructed in accordance with the principles of the invention.
Figure 2:
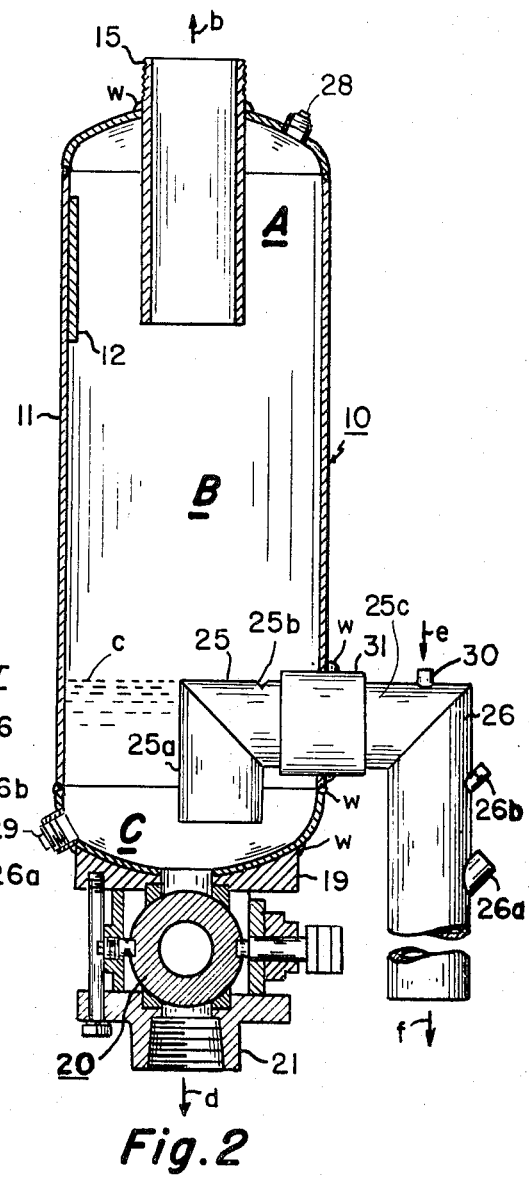
FIG. 2 is a vertical section on the scale of and through the unit of FIG. 1.
Figure 3:
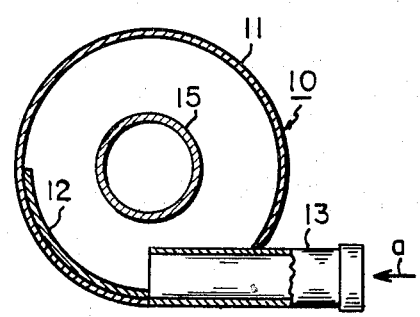
FIG. 3 is an upper horizontal section on the scale of and taken along the line III—III of FIG. 1, and, FIG. 4 is a lower horizontal section on the scale of and taken along the line IV—IV of FIG. 1.
Figure 4:
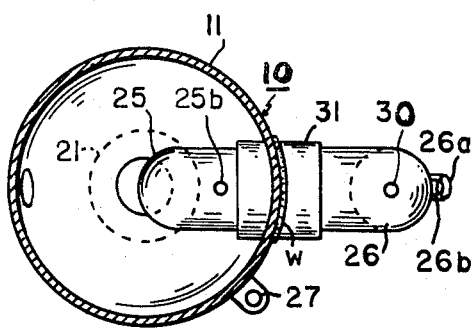

In carrying out the invention, a flash separator apparatus or device 10 is shown having a cylindrical-shaped vessel or container 11 whose metal enclosing side, and upper and lower, outwardly convex end walls define a vertically elongated chamber therein. The interior of the container 11 defines an upper flash, vortex sector or portion A into which incoming effluent under pressure is introduced through a tubular inlet pipe or member 13. This introduction is accomplished, at substantially right angles to a centralized removal of high temperature dry steam or vapor from the upper sector or chamber portion A, through a centrally disposed, vertically extending, vortex finder, outlet, discharge pipe or tubular member 15. To best employ velocity flow, the tubular inlet member 13 extends horizontally inwardly and has an inner, open delivery end which directs a stream of incoming effluent or liquid in a circular direction within the container 11 and in a substantially perpendicularly aligned relation with respect to the inner open end of the tubular outlet member 15. The inward flow of effluent strikes against a baffle plate 12, such as of stainless steel, which is shown as representing a section of a circular shape and as having a horizontal extent of about one fourth of the inner circumference of the side wall of the container or vessel 11. By way of example, a device having a vertical inside height of its enclosed chamber of about 22 inches and an inner diameter of about ten inches, thus may use a baffle 12 having an inwardly concave horizontal length of about 7.854 inches; it is positioned directly in the path of velocity entry of liquid or effluent through the inlet member 13.

It has been determined that the positioning between the members 13 and 15 is important for optimum results. That is, th inlet member 13 should, for optimum results, lie on a horizontal plane that is immediately along or substantially parallel to the lower open end of the vortex or outlet pipe 15. As shown, the bottom side of the tubular inlet member 13 extends along a plane which passes along the open inner end portion of the tubular outlet member 15. Using such an alignment as illustrated in FIG. 1 of the drawing, a 0.086 percent or minimum carryover of moisture is obtained from the standpoint of the steam passing through the vortex pipe or outlet member 15. If the inlet member 13, on the other hand, is located about two inches above the open mouth or end of the outlet member 15, the carryover has been found to increase to about 0.25 percent, and a two inch blow-positioning results in an increased carryover represented at about 0.58 percent. Thus, the location is important to optimize dryness of steam or vapor moving out through the tubular member 15.

The effluent or liquid entering through the inlet member 13 strikes the baffle 12 and moves in a swirling or cyclonic path about the vortex finder or outlet member 15, with the lighter density steam being within the center of the vortex and of a diameter substantially representing the inner diameter of the vortex tube or member 15. Portions of the effluent of increasing density move or rotate about the inner wall of the container 11, with the heaviest portions moving closely adjacent to the wall. The movement continues until the heavier portions which contain moisture pass downward in a swirling path through an intermediate or vortex chamber portion or sector B, down into a lower, condensate and liquid collecting chamber portion or sector C within which a liquid level c is maintained after the operation has been initiated. The liquid level c and the use of a side-positioned and extending liquid outlet pipe member assembly 25, 26 prevents any blow-through of the steam upon a sudden increase of pressure or upon variations of pressure of the effluent being introduced. It smooths out the operation and provides an effective operation that is trouble and substantially sound free.

The wall of the vessel or container 11 has a centrally disposed bottom outlet or drain mount 19 for a suitable valve, such as ball valve 20 which carries an outlet pipe or fitting 21. In this manner, liquid and sludge may be removed periodically from the lower sector C by opening and closing the valve 20. Also, the lower sector C may be opened where an excessive temporary load is being placed on the apparatus or device or it is desired to temporarily increase the removed liquid or to remove all of it. For example, a large volume of liquid may be handled, such as intermittently discharged from the blowdown of a cooling kettle, an autoclave, a boiler, etc.

The liquid outlet pipe system or assembly is shown of tubular inverted U-shape, as employed for removing water or liquid from the sector C. It includes an inside-positioned, cross-extending, horizontal connector or elbow member or portion 25. The elbow member 25 is integrally connected at its inner end portion to support a vertical, downwardly extenidng, open-end leg part 25a which will normally extend well below the level c of the liquid within the sector C. A top hole or opening 25b of about 1/4 to one-half of an inch in diameter in the upper side of the wall portion of the member 25 serves as a siphon breaker hole. The outer end of the outlet elbow member 25 is shown integrally connected by a collar 31 to a second horizontally extending, connector elbow member or portion 25c to therewith provide a horizontal connector part which extends outside the container wall 11. An outer vertical leg part or member 26 is supported by and secured at its upper end to the connector part. The leg part 26 is shown provided with a temperature regulator valve bulb well 26a, which may be of about one inch in diameter, and a thermometer receiving bulb well 26b which may be of about a quarter of an inch in diameter.

A further and highly effective cooling of the liquid outflow through the L-shaped liquid outlet members 25 and 26 is accomplished through the agency of a cooling fluid, liquid or water inlet nipple 30 which may be connected in a suitable manner by tubing or piping to a fluid cooling system to provide after-cooling of the liquid being removed from the container. As shown, the inlet 30 is located in an upper side wall of the horizontal portion 25c of the liquid outlet assembly adjacent to and in direct vertical downflow alignment with the downflow leg of the outer member 26 to supply and mix cooling fluid with the liquid being removed from the sector C before it is discharged downwardly outwardly from the vertical mixing leg part or member 26. Cooling liquid or water may be introduced and mixed within the member 26 to provide a desired temperature of outflowing liquid from a discharge end thereof, such for example, that the liquid discharge may be made directly into a natural body of water or a sewage disposal system.

The apparatus or device 10 is shown provided with upper and lower, removable inspection plugs 28 and 29 in its outwardly convexly curved, upper and lower end walls. A temperature gauge 27 is shown positioned on the outside of the wall of the container or vessel 11 and as connected between the sectors or chamber portions B and C. In the drawings, weld metal is represented by the reference w. It will be noted, by way of example, that the vortex outlet member 15 and the liquid outlet members 25a 25 25c and 26 (the liquid outlet assembly) may have the same diameter, e.g. about three inches, the fluid inlet member 13 may have a representative diameter of about one and a half inches which may correspond to the diameter of the flow bore of the sludge drain pipe or outlet 21. The cooling water nipple or connection 30 may be of a representative one half of an inch diameter and cooling water may be supplied under varied flow rates as determined by a control or regulator valve (not shown) which may be operated on the basis of temperatures presented in the well 26a. In the drawing, arrow a shows the direction of flow of the effluent being introduced through the inlet member 13, the arrow b shows the outflow of the relatively hot, dry steam through the member 15, the arrow d shows the direction of movement of sludge and water being removed through the drain outlet 21, and the arrow f shows the outflow of mixed, cooled liquid from the chamber portion or sector C.

In the construction shown, the steam and vapor containing effluent has a tangential entry into the upper section or chamber portion A, thus imparting a cyclonic spinning action with the central core or area being a low pressure vortex of steam. A minimum ratio of about one to two between the diameter and the length or depth of the chamber of the container 11 is such that sufficient centrifugal force is attained to assure against moisture or vapor being carried over with the steam. As previously pointed out, the location of the inlet member 13 with respect to the vortex finder or outlet member 15 is important and a slight variation of several inches will greatly affect the quality of outflowing steam.

The main drain for the liquid, contrary to conventional separators, is a side drain having a siphon 26b, such that the water level c is maintained in the lower sector C. This assures that when influent flow decreases, there is no possibility of steam being carried out through the liquid outlet members 25 and 26 and also provides for collecting sludge that can be removed periodically. The upwardly open hole 25b in the liquid outlet pipe 25 acts as a breaker to assure the maintenance of the water level. An after-cooler is, in effect, provided by the liquid outlet tube 26 which may be used to further cool down the condensate and liquid content of the effluent if it is necessary or desirable. The water level c, as shown, is maintained in a relatively shallow relationship in the bottom end of the container, representing about one sixth of the vertical extent or depth of the inner cavity or chamber of the device. There should be sufficient height with respect to the intermediate sector B to allow for flashing and to avoid pick-up of water from the section C.

A device such as disclosed may be used for a number of purposes. It may separate steam from hot water and other liquids that exist above their flash points. It may provide means for cooling the liquid content of the effluent after it is flashed and without condensing the valuable steam content thereof. If desired, the steam can be flashed to the atmosphere, wasting heat energy, so that a minimum amount of cooling liquid is required to cool the liquid which is being collected and discharged from the bottom of the device. The height or length of the chamber can be increased to allow for some liquid storage where it is desirable. As previously pointed out, the centrally disposed bottom drain outlet 21, may under normal operation, primarily be used for removal of sludge, and can also be used where larger volumes of water are intermittently being supplied and the load thus greatly increased.

I claim:

1. In a flash separating apparatus for separating and removing pure steam from a condensate and liquid content of a high temperature effluent being introduced thereto under positive pressure, a container having enclosing side and upper and lower end walls defining a vertically elongated chamber therein, a centrally disposed tubular pure steam outlet member extending upwardly outwardly through the upper end wall of said container, an effluent introducing tubular inlet member extending horizontally inwardly through the side wall into a cooperating substantially perpendicularly aligned position with respect to an inner open end portion of said steam outlet member for introducing high temperature effluent under pressure into said chamber and for moving it in a cyclonic path about said steam outlet member; said chamber providing an upper flash sector about said effluent inlet and steam outlet members, an intermediate vortex sector, and a liquid collecting lower sector therewithin; a tubular liquid outlet means for said lower sector comprising, an inner leg part that extends vertically downwardly within said liquid collecting lower sector and that has a lower open end portion to receive liquid from said lower sector, a cross-extending connector part supporting and secured at an inner end portion thereof to an upper end portion of said inner leg part and extending outwardly through the side wall of said container, and an outer leg part that extends vertically downwardly along the outside of said container and is secured at its upper end to an outer end of said connector part for receiving and discharging liquid from said liquid collecting lower section; and a siphon breaker means carried by said liquid outlet means and directly communicating with said lower sector for defining a liquid level within said lower sector.

2. In a flash separating apparatus as defined in claim 1, said siphon breaker means being an open portion within an upper wall portion of said connector part that is located within said lower sector.

3. In a flash separating apparatus as defined in claim 1, means for introducing a flow of cooling fluid directly to said tubular liquid outlet means externally of said lower sector for cooling liquid being removed from said lower sector as it is being discharged from said outer leg part.

4. In a flash separating apparatus as defined in claim 2, means for introducing a down-flow of cooling fluid directly to said tubular liquid outlet means externally of said lower sector for cooling liquid being removed from said lower sector as it is being discharged from said outer leg part.

5. In a flash separating apparatus as defined in claim 3, said means for introducing the cooling fluid being an inlet nipple that is mounted on the outer end portion of said connector part in direct down-flow alignment with said outer leg part.

6. In a flash separating apparatus as defined in claim 3, said tubular liquid outlet means being of inverted U-shape and said outer leg part thereof being of greater length than said inner leg part thereof.

7. In a flash separating apparatus as defined in claim 6, a centrally disposed bottom outlet within the lower end wall of said container for cleaning-out sludge from within said lower sector, and valve means for opening and closing said bottom outlet.

8. In a flash separating apparatus as defined in claim 1, said effluent introducing tubular inlet member having its bottom side extending substantially horizontally into the upper sector of said container on a plane that passes along the open inner end portion of said steam outlet member to optimize dryness of steam moving outwardly through said steam tubular outlet member.

9. In a flash separating apparatus as defined in claim 1, said tubular steam outlet member and said liquid outlet member being of substantially the same diameter and being about twice the diameter of said effluent introducing tubular inlet member.

10. In a flash separating apparatus for separating and removing pure steam from a condensate and liquid content of a high temperature effluent being introduced thereto under positive pressure, a container having enclosing side and upper and lower end walls defining a vertically elongated chamber therein, a centrally disposed tubular pure steam outlet member extending upwardly outwardly through the upper end wall of said container, an effluent introducing tubular inlet member extending horizontally inwardly through the side wall into a cooperating substantially perpendicularly aligned position with respect to an inner open end portion of said steam outlet member for introducing high temperature effluent under pressure into said chamber and for moving it in a cyclonic path about said steam outlet member; said chamber providing an upper flash sector about said effluent inlet and steam outlet members, an intermediate vortex sector, and a liquid collecting lower sector therewithin; a tubular liquid outlet means for said lower sector comprising, an inner leg part that extends vertically downwardly within said liquid collecting lower sector and that has a lower open end portion to receive liquid from said lower sector, a cross-extending connector part supporting and secured at an inner end portion thereof to an upper end portion of said inner leg part and extending outwardly through the side wall of said container, and an outer leg part that extends vertically downwardly along the outside of said container and is secured at its upper end to an outer end of said connector part for receiving and discharging liquid from said liquid collecting lower sector; said chamber having a minimum ratio of length to diameter of about 2 to 1, and means for introducing a flow of cooling fluid directly to said tubular liquid outlet means externally of said lower sector for cooling liquid being removed from said lower sector as it is being discharged from said outer leg part.

* * * * *